(12) United States Patent
Morns et al.

(10) Patent No.: US 11,913,922 B2
(45) Date of Patent: Feb. 27, 2024

(54) TECHNIQUES FOR TARGETED COMPOUND ANALYSIS

(71) Applicant: WATERS TECHNOLOGIES IRELAND LIMITED, Dublin (IE)

(72) Inventors: Ian Morns, Milford, MA (US); Jackson Pope, Milford, MA (US); Wilka Hudson, Milford, MA (US)

(73) Assignee: WATERS TECHNOLOGIES IRELAND LIMITED, Dublin (IE)

(*) Notice: Subject to any disclaimer, the term of this patent is extended or adjusted under 35 U.S.C. 154(b) by 629 days.

(21) Appl. No.: 16/818,763

(22) Filed: Mar. 13, 2020

(65) Prior Publication Data

US 2020/0292510 A1 Sep. 17, 2020

Related U.S. Application Data

(60) Provisional application No. 62/819,002, filed on Mar. 15, 2019.

(51) Int. Cl.
*G01N 30/00* (2006.01)
*G01N 30/86* (2006.01)

(52) U.S. Cl.
CPC ..... *G01N 30/8679* (2013.01); *G01N 30/8651* (2013.01); *G01N 30/8696* (2013.01)

(58) Field of Classification Search
CPC ........... G01N 30/8679; G01N 30/8651; G01N 30/8696; G01N 30/72
USPC ................................................. 250/281, 282
See application file for complete search history.

(56) References Cited

U.S. PATENT DOCUMENTS

| 7,391,015 B2* | 6/2008 | Bloomfield | ......... H01J 49/0036 |
| | | | 435/68.1 |
| 7,804,062 B2* | 9/2010 | Meija | ................. G01N 30/8675 |
| | | | 702/22 |
| 7,884,318 B2* | 2/2011 | Milgram | ............ G01N 30/8665 |
| | | | 435/7.1 |

(Continued)

FOREIGN PATENT DOCUMENTS

| CN | 101971019 A | 2/2011 |
| CN | 108140060 A | 6/2018 |
| WO | 2018064091 A1 | 4/2018 |

OTHER PUBLICATIONS

International Search Report and Written Opinion for International application No. PCT/IB2020/052338, dated Jun. 16, 2020, 13 pages.

(Continued)

*Primary Examiner* — Michael Maskell
(74) *Attorney, Agent, or Firm* — Goodwin Procter LLP

(57) ABSTRACT

Techniques and apparatus for performing target compound detection processes are described. In one embodiment, for example, an apparatus may include at least one memory, and logic coupled to the at least one memory. The logic may be configured to implement a targeted compound detection process, for example, by receiving raw data from analysis of a sample via an analytical device, generating cumulative data from the raw data, receiving compound specification information associated with the sample, and determining quantified compound information via performing targeted compound detection based on the cumulative data and the compound specification information to determine. Other embodiments are described.

16 Claims, 4 Drawing Sheets

(56) References Cited

U.S. PATENT DOCUMENTS

| | | | |
|---|---|---|---|
| 7,982,181 B1* | 7/2011 | Senko | G01N 30/72 |
| | | | 250/281 |
| 8,969,791 B2* | 3/2015 | Mukaibatake | H01J 49/26 |
| | | | 250/252.1 |
| 2012/0253684 A1* | 10/2012 | Gorenstein | G01N 33/6848 |
| | | | 250/288 |
| 2018/0166265 A1* | 6/2018 | Geromanos | G01N 33/68 |
| 2019/0041369 A1* | 2/2019 | Aisu | G01N 30/7233 |

OTHER PUBLICATIONS

Rogers, et al, "A View on the Importance of "Multi-Attribute Method" for Measuring Purity of Biopharmaceuticals and Improving Overall Control Strategy," The AAPS Journal (Nov. 2017).
International Search Report and Written Opinion for International Patent Application No. PCT/IB2020/052338, dated Sep. 30, 2021.
Office Action for Chinese Patent Application No. 202080036102.2, dated Sep. 1, 2023.

\* cited by examiner

TECHNIQUES FOR TARGETED COMPOUND ANALYSIS

CROSS-REFERENCE TO RELATED APPLICATIONS

This application claims the benefit of and priority to U.S. Provisional Patent Application No. 62/819,022, filed on Mar. 15, 2019, the entire contents of which are incorporated by reference.

TECHNICAL FIELD

Embodiments herein generally relate to processing analytical data and, more specifically, analytical data obtained from mass analysis of a sample.

BACKGROUND

Mass analysis techniques, such as mass spectrometry (MS) or ion mobility spectrometry (IMS), are widely used for identifying and quantifying compounds within a sample. For example, manufacturers and/or research organizations may use MS methods to determine expected and unexpected species in samples of interest. Such determinations are critical in evaluating manufacturing processes. For instance, pharmaceutical manufacturers may use MS methods to perform quality control (QC) processes, which may include verifying the presence of critical quality attributes (CQAs) and the absence of unwanted species in the products resulting from their manufacturing processes. However, conventional QC processes typically require multiple QC assays such as, for instance, ELISA and liquid chromatography, to evaluate a product. In addition, the processing of QC analysis data is a major bottleneck in the manufacturer's workflow to obtain regulatory approval and/or to certify the product for patient use. Accordingly, entities using mass analysis techniques to evaluate products may benefit from processes capable of quantifying compounds using methods that are more efficient and effective than conventional systems.

SUMMARY

In accordance with various aspects of the described embodiments is an apparatus that may include at least one memory and logic, coupled to the at least one memory, operative to implement a targeted compound detection process. The logic to receive raw data from analysis of a sample via an analytical device, generate cumulative data from the raw data, receive compound specification information associated with the sample, and determine quantified compound information via performing targeted compound detection based on the cumulative data and the compound specification information.

In some embodiments of the apparatus, the analytical device comprising at least one element of a liquid chromatography (LC) system, a gas chromatography (GC) system, a mass analyzer system, a mass spectrometer (MS) system, an ion mobility spectrometer (IMS) system, a high-performance liquid chromatography (HPLC) system, a ultra-performance liquid chromatography (UPLC®) system, a ultra-high-performance liquid chromatography (UHPLC) system, or any combination thereof.

In various embodiments of the apparatus, the targeted compound detection process comprising a multi-attribute monitoring (MAM) process. In some embodiments of the apparatus, the logic to generate the cumulative data by selecting at least one alignment target and aligning the raw data based on the at least one alignment target. In various embodiments of the apparatus, the logic to generate the cumulative data by aggregate building to generate an aggregate set. In exemplary embodiments of the apparatus, the logic to generate the cumulative data by apex building the aggregate set. In some embodiments of the apparatus, the compound specification information comprising at least one critical quality attributes (CQA). In various embodiments of the apparatus, the logic to determine unknown compounds based on detected compounds not included in the compound specification information.

In accordance with various aspects of the described embodiments is a method to provide a targeted compound detection process include. The method may include receiving raw data from analysis of a sample via an analytical device, generating cumulative data from the raw data, receiving compound specification information associated with the sample, and determining quantified compound information via performing targeted compound detection based on the cumulative data and the compound specification information.

In some embodiments of the method, the analytical device comprising at least one element of a liquid chromatography (LC) system, a gas chromatography (GC) system, a mass analyzer system, a mass spectrometer (MS) system, an ion mobility spectrometer (IMS) system, a high-performance liquid chromatography (HPLC) system, a ultra-performance liquid chromatography (UPLC®) system, a ultra-high-performance liquid chromatography (UHPLC) system, or any combination thereof.

In various embodiments of the method, the targeted compound detection process comprising a multi-attribute monitoring (MAM) process. In some embodiments of the method, comprising generating the cumulative data by selecting at least one alignment target and aligning the raw data based on the at least one alignment target. In various embodiments of the method, comprising generating the cumulative data by aggregate building to generate an aggregate set. In exemplary embodiments of the method, comprising generating the cumulative data by apex building the aggregate set. In some embodiments of the method, the compound specification information comprising at least one critical quality attributes (CQA). In various embodiments of the method, comprising determining unknown compounds based on detected compounds not included in the compound specification information.

DETAILED DESCRIPTION

Figure 1:
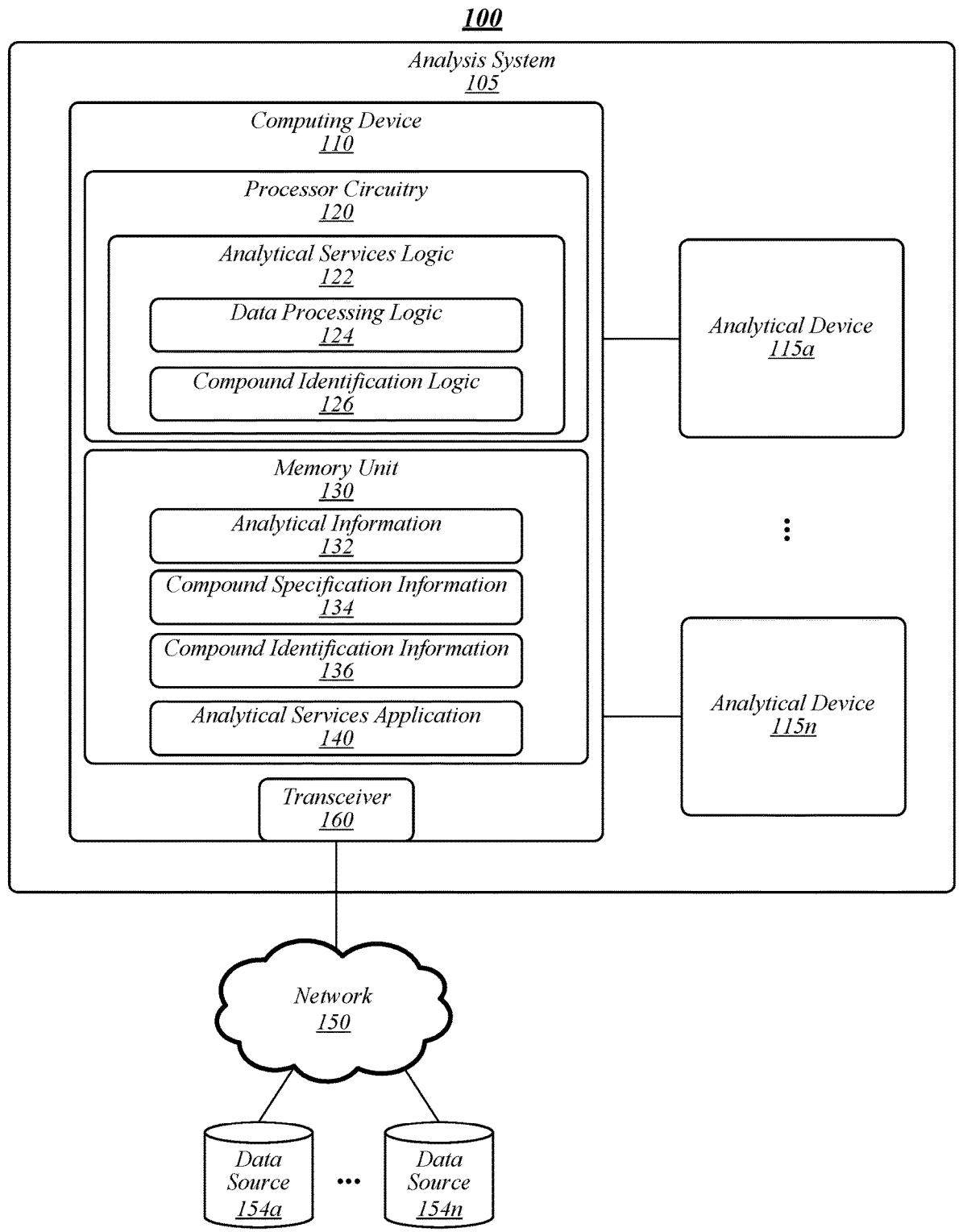
FIG. 1 illustrates an embodiment of a first operating environment.

Various embodiments may generally be directed toward systems, methods, and/or apparatuses for processing data generated by analytical instruments. In particular, some embodiments may provide a sample analysis process operative to identify and/or quantify the components of a sample. In some embodiments, the sample analysis process may include a targeted compound detection process operative to determine whether certain known or expected compounds are present in analytical data.

In various embodiments, the sample analysis process may generate cumulative data based on raw analytical data. In various embodiments, cumulative data may include aggregate, aligned, and/or clustered data. For example, for MS data, aggregate data may include data aligned based on an alignment target and aggregated to generate an aggregated set of ions that are present in all analyzed injections. Embodiments are not limited in this context.

In exemplary embodiments, the sample analysis process may receive compound specification information. In general, compound specification information may include information relating to expected compounds in the sample. For example, expected compounds may include species that are anticipated to be present in the sample. In this manner, the sample analysis process may perform targeted quantification (or targeted clustering) of the sample by analyzing specific areas of the cumulative data based on the compound specification information. In various embodiments, the sample analysis process may determine quantified compound information relating to located compounds that correspond to the compound specification information (for instance, a listing of expected compounds located in the cumulative data and/or quantitative data relating thereto, such as concentration, and/or the like). In some embodiments, the sample analysis process may determine unknown compound information that includes located compounds that do not correspond to the compound specification information (for instance, a listing of unexpected compounds located in the cumulative data and/or quantitative data relating thereto).

Systems and techniques according to some embodiments may be used for pharmaceutical and/or biopharmaceutical developers to evaluate products of interest. Although pharmaceutical and biopharmaceutical applications may be used in some examples in this Detailed Description, embodiments are not so limited. In particular, embodiments may be used in any application involving quantification of a sample, including, without limitation, food and environment (F&E) applications, toxicology (for example, forensic toxicology) applications, medical applications, clinical applications, environmental analysis applications, and/or the like.

For example, some embodiments may be used by regulated biopharmaceutical developers working in discovery, development, and QC laboratories. Such developers may require workflows for characterizing, monitoring, and/or performing QC for biotherapeutics. Accordingly, systems and techniques according to some embodiments may be or may include a GxP compliant biotherapeutic (for instance, peptide) analysis application. Systems and techniques according to some embodiments may provide efficient, effective, and user-friendly dedicated workflows, for peptide characterization, monitoring and QC, that guide users from the acquisition, processing, review and reporting of biotherapeutic LC-MS data. For example, some embodiments may provide a single software platform supporting high resolution instruments in Discovery and Development, and Acquity RDa, BioAccord, lower resolution instruments, and/or the like in QC with seamless transfer of methods and data between them.

In various embodiments, the sample analysis process may be or may include quality-by-design (QbD) analysis. A Multi-Attribute Monitoring (MAM) process may provide an optimized analytical solution, for instance, to focus on the attributes of a therapeutic molecule essential for function and implement QbD principles across process development, manufacturing, drug disposition, and/or the like. Some embodiments may provide a MAM processing pipeline or workflow. A non-limiting example of a MAM process may include processes as described in "A View on the Importance of 'Multi-Attribute Method' for Measuring Purity of Biopharmaceuticals and Improving Overall Control Strategy," The AAPS Journal, Rogers et al. (November 2017), which is hereby incorporated by reference.

In general, MAM may allow for direct monitoring of relevant product quality attributes (or critical quality attributes (CQAs)), in contrast to conventional methods which use indirect measurement techniques. A CQA may generally include a physical, chemical, biological, or microbiological property or characteristic that should be within an appropriate limit, range, or distribution to ensure a desired product quality. Biotherapeutics, particularly complex products such as monoclonal antibodies (mAbs), can have numerous quality attributes that can potentially impact safety and/or efficacy of a product.

Identifying CQAs for a biotherapeutic may be an initial and challenging step in implementation of a QbD and/or MAM for development and production of pharmaceuticals and/or biopharmaceuticals. CQAs that may be determined as part of a MAM workflow may include, without limitation, modification X on position Y, Lysine clipping, sequence variants, disulfide scrambling, contaminants (for instance, host-cell proteins), trisulfide bonds vs. native disulfide bonds vs. scrambled disulfides, and/or the like. Certain CQAs may be measured using mass analysis techniques, such as liquid chromatography-mass spectrometry (LC-MS). Non-limiting examples of CQAs that may be measured via LC-MS may include, without limitation, concentration, purity, PTMs, residual proteins, and/or sequence variants. MAM, which is an LC-MS based approach, may be preferred in the manufacture of pharmaceuticals and/or biopharmaceuticals instead of conventional methods because, among other things, only one method is required versus several assays, it is generally more robust and accurate than conventional methods, and provides improved control.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include an analysis system 105 operative to manage analytical information 132 associated with analytical devices 115a-n. In some embodiments, analytical devices 115a-n may be or may include a chromatography system, a liquid chromatography (LC) system, a gas chromatography (GC) system, a mass analyzer system, a mass detector system, a mass spectrometer (MS) system, an ion mobility spectrometer (IMS) system, a high-performance liquid chromatography (HPLC) system, a ultra-performance liquid chromatography (UPLC®) system, a ultra-high performance liquid chromatography (UHPLC) system, an ultraviolet (UV) detector, a visible light detector, a solid-phase extraction system, a sample preparation system, a sample introduction system, a pump system, a capillary electrophoresis instrument, combinations thereof, components thereof, variations thereof, and/or the like. Although LC, MS, and LC-MS are used in examples in this detailed description, embodiments are not so limited, as other analytical instruments capable of operating according to some embodiments are contemplated herein.

In some embodiments, analytical device 115a-n may operate to perform an analysis and generate analytical information 132. In various embodiments, analytical information 132 may include information, data, files, charts, graphs, images, and/or the like generated by an analytical instrument as a result of performing an analysis method. For example, for an LC-MS system, analytical device 115a-n may separate a sample and perform mass analysis on the separated sample according to a specified method to generate analytical information 132 that may include raw, native, or otherwise unprocessed data, chromatograms, spectra, peak lists, mass values, retention time values, concentration values, compound identification information, and/or the like.

The term raw data may refer to mass spectral data acquired in an elevated energy mode and/or a low energy mode may identify a plurality of scan times and, for each of said scan times, may identify one or more masses each of an ion detected during said each scan time and, for each of the one or more masses, may identify an intensity denoting an intensity of a detected ion having said each mass. The raw data may represent experimental data that has not been further processed to onvert the scan times to corresponding retention or drift times. For example, the raw data may represent data that has not been post processed by other software that performs peak detection, maps or translates raw scans and scan times to corresponding retention times and/or drift times, software which performs retention time alignment and associates precursor and fragment or product ions as originating from a same originating molecule based on common retention times of such ions, and the like. The raw data may be unfiltered data.

In various embodiments, analysis system 105 may include computing device 110 communicatively coupled to analytical device 115a-n or otherwise configured to receive and store analytical information 132 associated with analytical device 115. For example, analytical device 115a-n may operate to provide analytical information 132 directly to computing device 110 and/or to a location on a network 150 (for instance, a database, a cloud computing environment, a storage device, a storage network, a server, and/or the like) accessible to computing device 110. In some embodiments, computing device 110 may be operative to control, monitor, manage, or otherwise process various operational functions of analytical device 115a-n. In some embodiments, computing device 110 may be operative to provide analytical information 132 to a location on a network 150 through a secure or authenticated connection. In some embodiments, computing device 110 may be or may include a stand-alone computing device, such as a personal computer (PC), server, tablet computing device, cloud computing device, mobile computing device (for instance, a smart phone, tablet computing device, and/or the like), data appliance, and/or the like. In various embodiments, computing device 110 may be or may include a controller or control system integrated into analytical device 115a-n to control operational aspects thereof.

Although only one computing device 110 is depicted in FIG. 1, embodiments are not so limited. In various embodiments, the functions, operations, configurations, data storage functions, applications, logic, and/or the like described with respect to computing device 110 may be performed by and/or stored in one or more other computing devices. A single computing device 110 is depicted for illustrative purposes only to simplify the figure.

As shown in FIG. 1, computing device 110 may include processor circuitry 120, a memory unit 130, and a transceiver 160. Processor circuitry 120 may be communicatively coupled to memory unit 130 and/or transceiver 160.

Processor circuitry 120 may include and/or may access various logic for performing processes according to some embodiments. For instance, processor circuitry 120 may include and/or may access analytical services logic 122, data processing logic 124, and/or compound identification logic 126. Processing circuitry 120 and/or analytical services logic 122, data processing logic 124, and/or compound identification logic 126, and/or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 400. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although analytical services logic 122 is depicted in FIG. 1 as being within processor circuitry 120, embodiments are not so limited. In addition, although data processing logic 124 and compound identification logic 126 are depicted as being a logic of analytical services logic 122, embodiments are not so limited, as data processing logic 124, data system logic 128, and/or system controller logic may be separate logics and/or may not be standalone logics but, rather, a part of analytical services logic 122. For example, analytical services logic 122, and/or any component thereof, may be located within an accelerator, a processor core, an interface, an individual processor die, implemented entirely as a software application (for instance, analytical services application 140) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store an analytical services application 140 that may operate, alone or in combination with analytical services logic 122, to perform various analytical services according to some embodiments. In various embodiments, analytical services application 140 may interact with analytical devices 115a-n and/or components thereof through various drivers (which may include application programming interfaces (APIs) and/or the like), software and/or hardware interfaces, and/or the like.

In various embodiments, analytical services logic 122 may be configured to provide and/or implement analytical services for analytical devices 115a-n. In exemplary, analytical services may operate to generate, receive, and/or process analytical information 132 resulting from analyses performed via analytical devices 115a-n. In some embodiments, data processing logic 124 may operate to process analytical information 132. For example, data processing logic 124 may perform processing on raw data received from analytical instruments 115a-n, such as aggregating, clustering, apex building, and/or the like (see, for example, FIG. 3). In various embodiments, compound identification logic 126 may operate to identify compounds in a sample associated with analytical information 132. For example, compound identification logic 126 may access compound specification information 134 to determine compounds of interest (for instance, known or expected compounds, CQAs, and/or the like) in a sample. Compound identification logic 126 may perform targeted compound detection (or clustering) processes (see, for example, FIG. 3) according to some embodiments to determine compound identification information 136 based on compound specification information 134. In some embodiments, compound identification information 136 may include compounds and/or qualities concerning compounds (for instance, CQAs) in a sample based on compound specification information 134. In some embodiments, some or all of analytical information 132, compound specification information 134, and/or compound identification information 136 may be received from and/or stored on data sources 154a-n accessible via network 150.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 2:
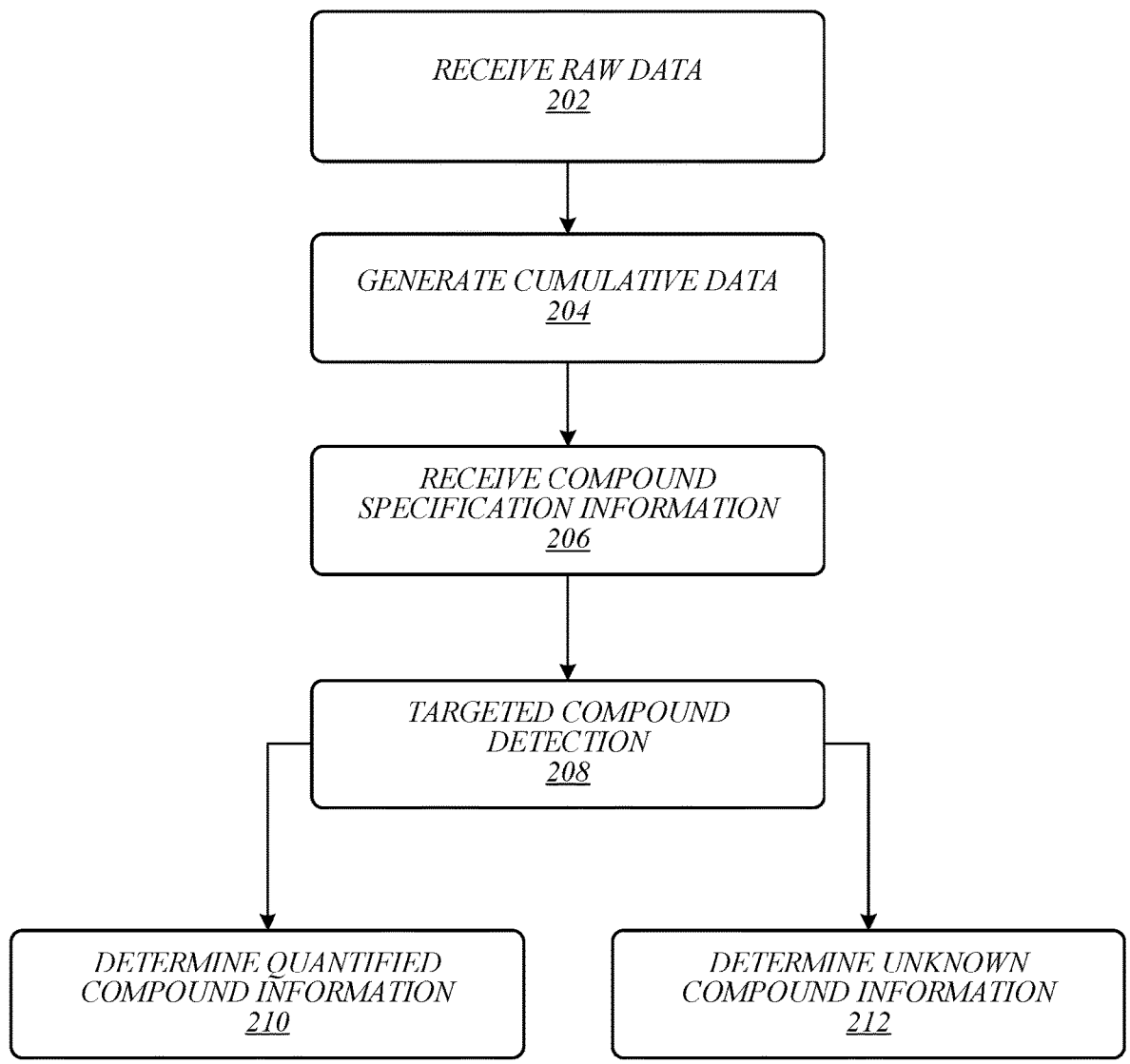
FIG. 2 illustrates an embodiment of a first logic flow.

FIG. 2 illustrates an embodiment of a logic flow 200. Logic flow 200 may be representative of some or all of the operations executed by one or more embodiments described herein, such as by computing device 110. For instance, logic flow 200 may be representative of some or all of the operations of a sample analysis according to some embodiments.

At block 202, logic flow 200 may receive raw data. For example, analytical service logic 122 may receive or otherwise access analytical information 132 in the form of raw data from analytical device 115a. Although raw data may be used in some examples in this Detailed Description, embodiments are not so limited, as processed and/or semi-processed data may also be used according to some embodiments. In various embodiments, raw data may include, without limitation, raw or unprocessed data. In some embodiments, raw data may include, without limitation, processed data, chromatograms, spectra, peak lists, mass values, retention time values, concentration values, compound identification information, and/or the like. Embodiments are not limited in this context.

Logic flow 200 may generate cumulative data at block 204. For example, analytical services logic 122 may perform alignment, aggregation, clustering, apex building, and/or the like (see, for example, 304, 306, 308, and/or 310 of FIG. 3) on analytical information 132 to generate cumulative data. In various embodiments, the cumulative data may be stored as analytical information. In this manner, logic flow 200 may perform sample analysis processes on a cumulative set of information rather than, as in conventional systems, individual sampling data sets (for instance, a cumulative set of injections as compared to individual injections).

At block 208, logic flow 200 may perform targeted compound detection. For example, analytical services logic 122 may access compound specification information 134 to determine which compounds and/or compound information (for instance, CQAs) that the sample analysis processes are looking for (see, for example, 314, 316, and 318 of FIG. 3). Accordingly, analytical services logic 122 may analyze, search, or otherwise process specified locations (for instance, based on m/z, retention time, intensity, drift time, and/or the like) to determine whether a compound of interest is present (as well as expected characteristics, for example, based on corresponding CQA information).

Logic flow 200 may determine quantified compound information at block 210. For example, analytical services logic 122 may determine compounds and associated information (for instance, concentrations, variants, and/or the like) of compounds specified in the compound specification information. In this manner, logic flow 200 may verify the presence of expected compounds (or "hits") in the raw data. At block 212, logic flow 200 may determine unknown compound information. For example, analytical services logic 122 may determine which potential compounds (for instance, peaks) are in the raw data that were not indicated in the compound specification information (for instance, "unknowns") (see, for example, 320, 322, 324, 326, and 328 of FIG. 3).

Figure 3:
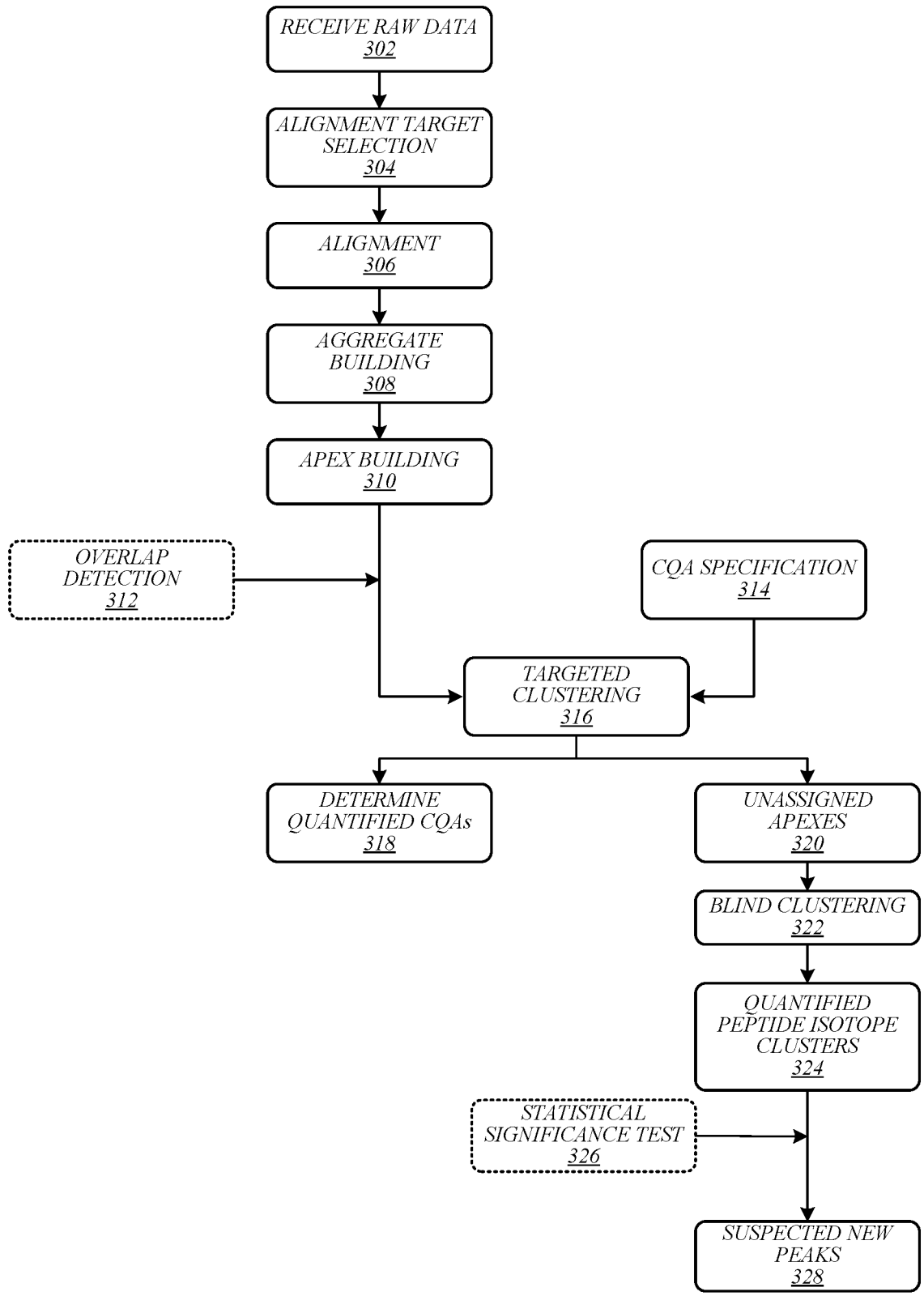
FIG. 3 illustrates an embodiment of a second logic flow.

FIG. 3 illustrates an embodiment of a logic flow 300. Logic flow 300 may be representative of some or all of the operations executed by one or more embodiments described herein, such as by computing device 110. For instance, logic flow 300 may be representative of some or all of the operations of a sample analysis operating a MAM processing workflow for CQAs according to some embodiments.

At block 302, logic flow 300 may receive raw data. For example, analytical services logic 122 may receive raw data from a control or data application for analytical device 115a. Non-limiting examples of control or data applications may include computing systems operating the UNIFI® platform and/or the Empower® platform provided by Waters Corporation of Milford, Massachusetts, United States.

Logic flow 300 may perform alignment target selection at block 304 and alignment at block 306. For example, analytical services logic 122 may determine an alignment target for use in aligning the raw data. Selecting an alignment target may include a manual and/or automatic process for selecting distinct data having a reasonably high signal, including, for instance, prominent features across an injection.

In various embodiments, alignment may be or may include correcting for retention time differences for samples run through LC at different times. For example, comparing the features in different injections to determine a time correction. An alignment process may operate to attempt to get each signal at the same retention time across all injections. For instance, in some embodiments, alignment may include moving data back/forward in time to line up with the alignment target (or reference sample). Accordingly, retention times may be consistent or substantially consistent across an experiment. In various embodiments, an alignment process may include finding the alignment target on each injection, then aligning each injection individually to the alignment target. In some embodiments, alignment may be or may include shape matching across multiple injections based on, for example, the alignment target.

Logic flow 300 may perform aggregate building at block 308. In conventional processes, each injection is processed individually. Accordingly, for example, apex building may be performed on each injection individually to pick out ions in the data. However, in some embodiments, aggregate building may allow for, with each injection, applying retention time correction, then building an averaged pseudo-injection. All or substantially all of the injections may be summed together after applying corrections, such as retention time corrections (for instance, alignment).

During an analysis, ions may elute over a retention time with a particular m/z. Logic flow 300 may locate all of the ions in the data (for instance, a particular retention time range with an m/z range, another particular retention time range with an m/z range, and so forth) to find matches. Conventional system may perform such processes on each injection, then attempt to match afterwards. However, an aggregate building process according to some embodiments may, on each injection, apply retention time correction, then build an averaged pseudo-injection summing all of the injections together after applying retention time corrections. In some embodiments, corrections may not be a single number for an entire run, for example, corrections may be non-linear and may vary across a run (for instance, data may be moved back 30 seconds at one point, moved back 2 seconds at a different point, and so on). Accordingly, embodiments may generate, through blocks 304-308, an aggregate ("aggregate set" or "super set") of all ions that exist in all injections of the analysis.

At block 310, logic flow 300 may perform apex building. For example, analytical services logic 122 may perform apex building on the aggregate set. Accordingly, in some embodiments, apex building may be run once on the aggregate set to provide for, inter alia, measurement of the same area on each run. As described above, processes according to some embodiments may be or may include MAM processes. In general, MAM is a comparative workflow in which analyses may operate to determine how a compound (for instance, a peptide) or an area increases or decreases in different samples. Therefore, MAM may be performed according to some embodiments to measure the same area in each sample, and operators are able to obtain more robust statistics and are less likely to get missing data points from some injections.

In some embodiments, logic flow 300 may perform overlap detection at optional block 312. In some embodiments, overlap detection may be performed to handle co-eluting ions having the same or substantially similar mass and/or m/z. In such situations, areas where two different ions are being measured at the same time may occur. Overlap detection processes may operate to exclude one of them from the measurements. In some embodiments, an overlap detection process may operate to analyze the shapes in the apexes, look for areas where they merge with each other or other characteristics of co-elution. Some embodiments may provide for a tolerance for noise and/or parametric analysis to determine where the peaks compromise each other.

At block 314, logic flow 300 may perform CQA specification. For example, analytical services logic 122 may receive or otherwise access compound specification information 134. For example, a set of compounds and/or characteristics of interest may be established for a sample as compound specification information 134. In some embodiments, compound specification information 134 may be or may include a list of compounds of interest (for instance, 10-20 compounds). Compound specification information 134 may operate to specify where the analysis expects to detect certain information, including, without limitation, peaks, retention time, m/z, fragment information, sequence information, translational modifications, versions (for instance, oxidized, sulfide bonds, and/or the like), to identify a compound (for instance, an ion of a compound of interest).

Logic flow 300 may perform targeted clustering at block 316. For instance, because compound specification information 134 (for example, CQA information) indicates what the analysis is (or is expecting) to measure (for example, information to work out what the ion of interest should look like (for example, isotope configuration, spacing, retention time, m/z (i.e., charge 3+ with a particular configuration), then the analysis can go and look for that ion.

In conventional systems, processes use a blind discovery method with a compound building task. For example, putting different ions into a cluster, then placing charge states together to get a single peptide. However, in some embodiments, because compound specification information 134 (for example, CQA information) indicates which charge states to look for, sample analysis processes according to some embodiments may work out what the isotope cluster for each charge state should look like, which may then be detected in the detected apexes. For example, sample analysis processes according to various embodiments may analyze the data directly, looking at a specific data location to know what should be there.

Accordingly, sample analysis processes according to some embodiments may operate by confirming detected and/or expected data (compared with detecting what is there as with conventional systems). In conventional systems, each apex at each injection would be analyzed, while another process determines how to join them together to put a group of clusters together to make a single peptide. However, such processes are prone to mistakes, such as missing the first peak of an isotope cluster, wrong charge state, and/or the like. For example, conventional processes may look for a peptide cluster with a particular monoisotopic m/z through a "blind" process where the process may not be able to identify as it does not know what it is looking for. In particular, conventional processes may look for an ion with a particular m/z and/or retention time. However, if the process is wrong, then the process will not find it because the process does not know ahead of time what it is looking for. However, sample analysis processes according to some embodiments may use compound specification information 134 (for example, CQA information) to go and look at the exact right place, which provides for more efficient and effective sample analyses.

Logic flow 300 may determine quantified CQAs at block 318. For example, analytical services logic 122 may generate compound identification information 136 indicating compounds located during the sample analysis and any associated information (for instance, concentration, variances, and/or the like). In a MAM process, an operator may desire to determine all CQAs in all of the injections and the amount in each injection. In some embodiments, the compound identification information 136 may be generated from the raw data (analytical information 132) an amount of each CQA in each run (for instance, areas under the curves of the clusters built via logic flow 300).

In some embodiments, blocks 320, 322, 324, 326, and 328 may be used to determine new or unknown compounds in the sample. For example, unknown compounds may include non-target compounds not specified in CQA specification at block 314.

Logic flow 300 may determine unassigned apexes at block 320. For example, analytical services logic 122 may determine unassigned apexes via taking the output of block 310 (for instance, data generated as a result of apex building on the aggregate set) and removing data that contributed to the targeted clusters determined in block 316. At block 322, logic flow 300 may perform blind clustering. For example, analytical services logic 122 may cluster the unassigned apexes (for instance, determined in block 320) into peptide isotope clusters. In some embodiments, the unassigned apexes may be clustered by grouping unassigned apexes with similar retention time profiles and/or m/z gaps that signify that the unassigned apexes belong to different isotope peaks of the same peptide isotope cluster (for instance, a m/z difference of 1 Da implies a charge 1 ion, a m/z difference of 0.5 Da implies a charge 2 ion, etc.). In various embodiments, when the retention time profiles are similar, and the m/z differences are as expected, the unassigned apexes may be clustered to form a peptide isotope cluster. In some embodiments, each peptide isotope cluster may include a series of areas (for instance, rectangular areas) in m/z and retention time, each of which may correspond to a single isotope peak.

Logic flow 300 may determine quantified peptide ions, peptide isotopes, peptide isotope clusters, and/or peptide charge states at block 324. For example, analytical services logic 322 may transpose the peptide isotope clusters (for instance, generated at block 322) back to each individual injection. In some embodiments, the transposition may include using the inverse of the transform determined during the alignment process (for instance, at block 306) to find the location of the areas (for instance, rectangles) on the original injections. In various embodiments, the transposed rectangles may be used as an area to quantify, and an area under the curve (for instance, in 2D for MS data, 3D for ion mobility or SONAR data, and/or the like) may be calculated for each rectangle. In exemplary embodiments, areas for the rectangles may be summed for each injection to give a peptide isotope cluster abundance measurement for each injection.

Logic flow 300 may perform an optional statistical significance test at block 326 to determine whether any of the suspected ions meet certain statistical thresholds (for example, to alleviate noise, false positives, and/or the like). For example, for one or more samples under analysis, the measured peptide isotope cluster abundances for that sample may be compared to those of a reference sample to determine peptide isotope clusters which have changed significantly in abundance relative to the reference. If multiple injections are present for each sample, a statistical significance test can be used to calculate the likelihood that a change of abundance represents a real difference in the sample and is not, for instance, noise recorded during the instrument acquisition process. Additionally, even if only a single injection per sample exists, metrics such as fold change, abundance, isotope profile, charge state distribution and mass defect can be used to judge if an apparent new peak is likely to be real.

At block 328, logic flow 300 may determine suspected new peaks. For example, peptide ion clusters which pass the tests performed in block 326 may be considered suspected new peaks. In some embodiments, the suspected new peaks may be presented to the user for review as they may represent a new peptide or significantly changing existing peptide which could, for example, potentially have an effect on the efficacy or safety of the product.

Figure 4:
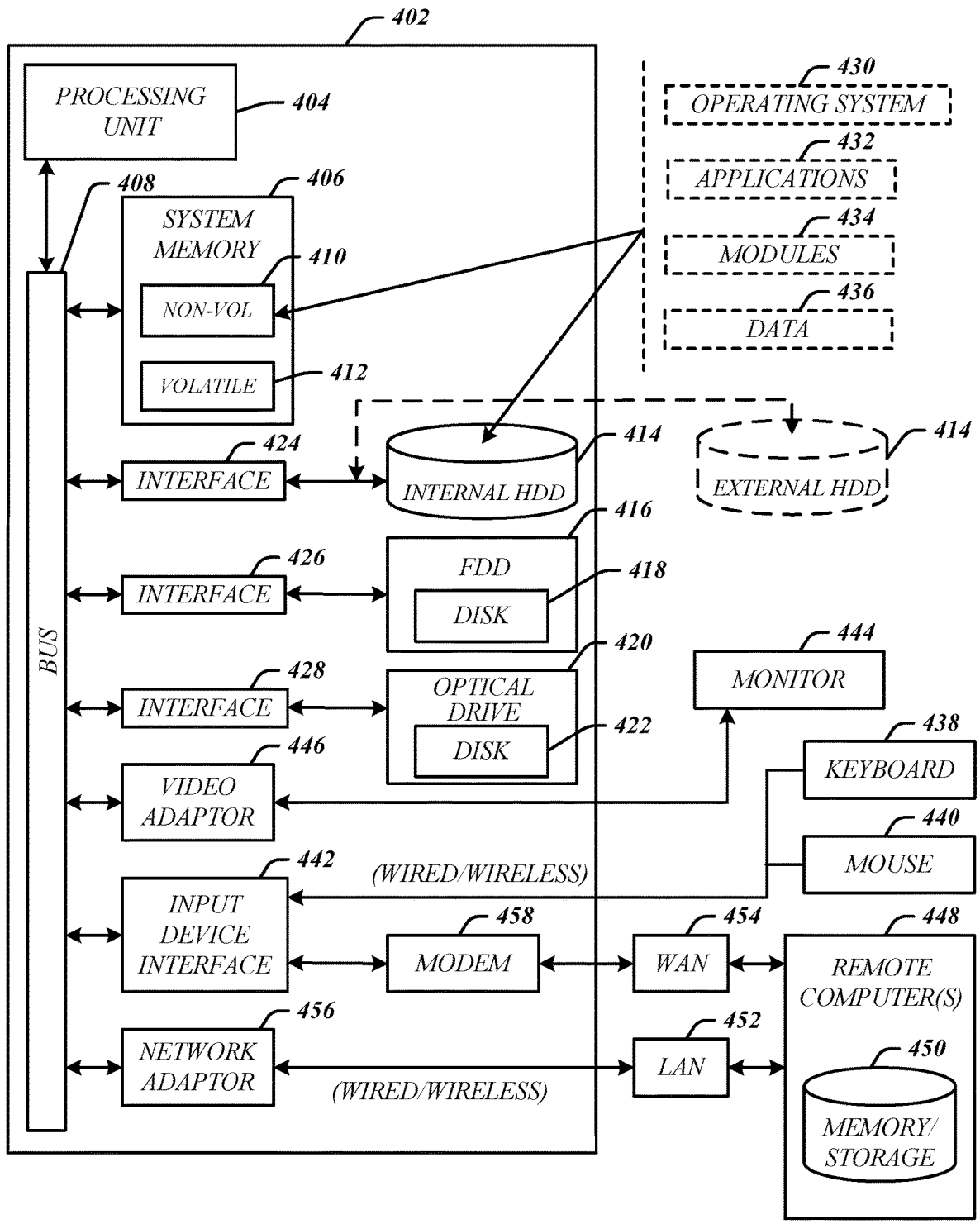
FIG. 4 illustrates an embodiment of a computing architecture.

FIG. 4 illustrates an embodiment of an exemplary computing architecture 400 suitable for implementing various embodiments as previously described. In various embodiments, the computing architecture 400 may comprise or be implemented as part of an electronic device. In some embodiments, the computing architecture 400 may be representative, for example, of computing device 110. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 400.

As shown in FIG. 4, the computing architecture 400 comprises a processing unit 404, a system memory 406 and a system bus 408. The processing unit 404 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 404.

The system bus 408 provides an interface for system components including, but not limited to, the system memory 406 to the processing unit 404. The system bus 408 can be any of several types of bus structure that may further interconnect to a memory bus (with or without a memory controller), a peripheral bus, and a local bus using any of a variety of commercially available bus architectures. Interface adapters may connect to the system bus 408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 4, the system memory 406 can include non-volatile memory 410 and/or volatile memory 412. A basic input/output system (BIOS) can be stored in the non-volatile memory 410.

The computer 402 may include various types of computer-readable storage media in the form of one or more lower speed memory units, including an internal (or external) hard disk drive (HDD) 414, a magnetic floppy disk drive (FDD) 416 to read from or write to a removable magnetic disk 418, and an optical disk drive 420 to read from or write to a removable optical disk 422 (e.g., a CD-ROM or DVD). The HDD 414, FDD 416 and optical disk drive 420 can be connected to the system bus 408 by a HDD interface 424, an FDD interface 426 and an optical drive interface 428, respectively. The HDD interface 424 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 410, 412, including an operating system 430, one or more application programs 432, other program modules 434, and program data 436. In one embodiment, the one or more application programs 432, other program modules 434, and program data 436 can include, for example, the various applications and/or components of computing device 110

A user can enter commands and information into the computer 402 through one or more wire/wireless input devices, for example, a keyboard 438 and a pointing device, such as a mouse 440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 404 through an input device interface 442 that is coupled to the system bus 408 but can be connected by other interfaces such as a parallel port, IEEE 1394 serial port, a game port, a USB port, an IR interface, and so forth.

A monitor 444 or other type of display device is also connected to the system bus 408 via an interface, such as a video adaptor 446. The monitor 444 may be internal or external to the computer 402. In addition to the monitor 444, a computer typically includes other peripheral output devices, such as speakers, printers, and so forth.

The computer 402 may operate in a networked environment using logical connections via wire and/or wireless communications to one or more remote computers, such as a remote computer 448. The remote computer 448 can be a workstation, a server computer, a router, a personal computer, portable computer, microprocessor-based entertainment appliance, a peer device or other common network node, and typically includes many or all of the elements described relative to the computer 402, although, for purposes of brevity, only a memory/storage device 450 is illustrated. The logical connections depicted include wire/wireless connectivity to a local area network (LAN) 452 and/or larger networks, for example, a wide area network (WAN) 454. Such LAN and WAN networking environments are commonplace in offices and companies, and facilitate enterprise-wide computer networks, such as intranets, all of which may connect to a global communications network, for example, the Internet.

When used in a LAN networking environment, the computer 402 is connected to the LAN 452 through a wire and/or wireless communication network interface or adaptor 456.

The adaptor 456 can facilitate wire and/or wireless communications to the LAN 452, which may also include a wireless access point disposed thereon for communicating with the wireless functionality of the adaptor 456.

When used in a WAN networking environment, the computer 402 can include a modem 458, or is connected to a communications server on the WAN 454 or has other means for establishing communications over the WAN 454, such as by way of the Internet. The modem 458, which can be internal or external and a wire and/or wireless device, connects to the system bus 408 via the input device interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
  at least one memory; and
  logic, coupled to the at least one memory, operative to implement a targeted compound detection process, the logic to:
    receive raw data from analysis of a sample via an analytical device,
    generate cumulative data from the raw data, the cumulative data representing aggregate, aligned, or clustered data from a cumulative set of injections to the analytical device, wherein on each injection, a retention time correction is applied, and the cumulative data represents an averaged pseudo-injection that is built by summing the injections together after applying the retention time corrections,
    receive compound specification information associated with the sample, and
    determine quantified compound information via performing targeted compound detection based on the cumulative data and the compound specification information.

2. The apparatus of claim 1, the analytical device comprising at least one element of a liquid chromatography (LC) system, a gas chromatography (GC) system, a mass analyzer system, a mass spectrometer (MS) system, an ion mobility spectrometer (IMS) system, a high-performance liquid chromatography (HPLC) system, a ultra-performance liquid chromatography (UPLC®) system, a ultra-high-performance liquid chromatography (UHPLC) system, or any combination thereof.

3. The apparatus of claim 1, the targeted compound detection process comprising a multi-attribute monitoring (MAM) process.

4. The apparatus of claim 3, the logic to generate the cumulative data by selecting at least one alignment target and aligning the raw data based on the at least one alignment target.

5. The apparatus of claim 4, the logic to generate the cumulative data by aggregate building to generate an aggregate set.

6. The apparatus of claim 5, the logic to generate the cumulative data by apex building the aggregate set.

7. The apparatus of claim 1, the compound specification information comprising at least one critical quality attributes (CQA).

8. The apparatus of claim 7, the logic to determine unknown compounds based on detected compounds not included in the compound specification information.

9. A method to provide a targeted compound detection process, comprising:
receiving raw data from analysis of a sample via an analytical device;
generating cumulative data from the raw data, the cumulative data representing aggregate, aligned, or clustered data from a cumulative set of injections to the analytical device, wherein on each injection, a retention time correction is applied, and the cumulative data represents an averaged pseudo-injection that is built by summing the injections together after applying the retention time corrections;
receiving compound specification information associated with the sample; and
determining quantified compound information via performing targeted compound detection based on the cumulative data and the compound specification information.

10. The method of claim 9, the analytical device comprising at least one element of a liquid chromatography (LC) system, a gas chromatography (GC) system, a mass analyzer system, a mass spectrometer (MS) system, an ion mobility spectrometer (IMS) system, a high-performance liquid chromatography (HPLC) system, a ultra-performance liquid chromatography (UPLC®) system, a ultra-high-performance liquid chromatography (UHPLC) system, or any combination thereof.

11. The method of claim 10, the targeted compound detection process comprising a multi-attribute monitoring (MAM) process.

12. The method of claim 11, comprising generating the cumulative data by selecting at least one alignment target and aligning the raw data based on the at least one alignment target.

13. The method of claim 12, comprising generating the cumulative data by aggregate building to generate an aggregate set.

14. The method of claim 13, comprising generating the cumulative data by apex building the aggregate set.

15. The method of claim 9, the compound specification information comprising at least one critical quality attributes (CQA).

16. The method of claim 15, comprising determining unknown compounds based on detected compounds not included in the compound specification information.

* * * * *